US008293159B2

(12) United States Patent
McAllister

(10) Patent No.: US 8,293,159 B2
(45) Date of Patent: Oct. 23, 2012

(54) METHOD AND APPARATUS FOR MANUFACTURING FILLED LINKERS

(75) Inventor: Stephen Mark McAllister, Sandwich (GB)

(73) Assignee: Capsugel Belgium, Bornem (BE)

( * ) Notice: Subject to any disclaimer, the term of this patent is extended or adjusted under 35 U.S.C. 154(b) by 20 days.

(21) Appl. No.: 12/285,855

(22) Filed: Oct. 15, 2008

(65) Prior Publication Data

US 2009/0108492 A1 Apr. 30, 2009

Related U.S. Application Data

(60) Provisional application No. 60/960,785, filed on Oct. 15, 2007, provisional application No. 61/000,898, filed on Oct. 30, 2007.

(51) Int. Cl.
*B29B 13/00* (2006.01)

(52) U.S. Cl. ...................... 264/271.1; 264/278; 424/451

(58) Field of Classification Search .................. 264/264, 264/278, 271.1; 206/528; 424/451, 454, 424/457, 463

See application file for complete search history.

(56) References Cited

U.S. PATENT DOCUMENTS

| | | | |
|---|---|---|---|
| D33,284 | S | 10/1900 | Clement |
| 691,687 | A | 1/1902 | Wilson |
| 1,079,438 | A | 11/1913 | Pollock |
| 2,718,980 | A | 9/1955 | Strom |
| 3,048,526 | A | 8/1962 | Boswell |
| 3,186,910 | A | 6/1965 | Glassman |
| 3,228,789 | A | 1/1966 | Glassman |
| 3,823,816 | A | 7/1974 | Controulis et al. |
| 4,196,565 | A | 4/1980 | Bodenmann et al. |
| 4,442,941 | A | 4/1984 | Keith |
| 4,487,327 | A | 12/1984 | Grayson |
| 4,543,138 | A | 9/1985 | Bollinger et al. |
| 4,564,363 | A | 1/1986 | Bagnall et al. |
| 4,576,284 | A | 3/1986 | Wittwer et al. |
| 4,591,475 | A | 5/1986 | Tomka et al. |
| D285,837 | S | 9/1986 | Wittwer |
| 4,655,840 | A | 4/1987 | Wittwer et al. |
| 4,678,516 | A | 7/1987 | Alderman et al. |
| 4,724,019 | A | 2/1988 | Brown et al. |

(Continued)

FOREIGN PATENT DOCUMENTS

BE 900950 4/1985

(Continued)

OTHER PUBLICATIONS

Elizabeth Carbide Die Co., Inc. "The Elizabeth Companies tablet Design Traning Manual" 2003.*

(Continued)

*Primary Examiner* — Galen Hauth
(74) *Attorney, Agent, or Firm* — Finnegan, Henderson, Farabow, Garrett & Dunner LLP

(57) ABSTRACT

A method of manufacturing a linker of the type having an injection molded jacket radially confining a preformed tablet. The method includes grasping the tablet about the outer surface with a plurality of pincers and positioning the grasped tablet and the pincers with respect to a molding apparatus. The method also includes supporting the tablet via the pincers and injecting jacket material to cover the outer tablet surface and the pincers. The method further includes extracting the jacketed tablet from the molding apparatus and removing the pincers from the jacketed tablet. The method may also include supporting and longitudinally positioning the tablet within the mold via a plurality of additional pincers.

30 Claims, 9 Drawing Sheets

U.S. PATENT DOCUMENTS

| | | | | |
|---|---|---|---|---|
| 4,738,724 | A | 4/1988 | Wittwer et al. | |
| 4,738,817 | A * | 4/1988 | Wittwer et al. | .......... 264/328.14 |
| 4,764,378 | A | 8/1988 | Keith et al. | |
| 4,774,092 | A | 9/1988 | Hamilton | |
| 4,790,881 | A | 12/1988 | Wittwer et al. | |
| 4,792,451 | A | 12/1988 | Kim | |
| 4,793,493 | A | 12/1988 | Makiej, Jr. | |
| 4,806,337 | A | 2/1989 | Snipes et al. | |
| 4,893,721 | A | 1/1990 | Bodenmann et al. | |
| 4,899,516 | A | 2/1990 | Krieger et al. | |
| 4,915,954 | A | 4/1990 | Ayer et al. | |
| 4,936,461 | A | 6/1990 | Makiej, Jr. | |
| 4,964,262 | A | 10/1990 | Moser et al. | |
| 5,004,601 | A | 4/1991 | Snipes | |
| 5,074,426 | A | 12/1991 | Goodhart et al. | |
| 5,082,655 | A | 1/1992 | Snipes et al. | |
| 5,135,752 | A | 8/1992 | Snipes | |
| 5,139,790 | A | 8/1992 | Snipes | |
| 5,223,265 | A | 6/1993 | Wong | |
| 5,244,668 | A | 9/1993 | Snipes | |
| 5,312,008 | A | 5/1994 | Davis | |
| 5,312,388 | A | 5/1994 | Wong et al. | |
| 5,312,390 | A | 5/1994 | Wong | |
| 5,443,461 | A | 8/1995 | Atkinson et al. | |
| 5,456,919 | A | 10/1995 | Patell et al. | |
| 5,672,359 | A | 9/1997 | Digenis et al. | |
| 5,750,143 | A | 5/1998 | Rashid et al. | |
| 5,769,267 | A | 6/1998 | Duynslager et al. | |
| 5,871,116 | A | 2/1999 | Picchietti | |
| 6,200,600 | B1 | 3/2001 | Rashid | |
| 6,367,228 | B1 | 4/2002 | Wurst et al. | |
| D481,456 | S | 10/2003 | McAllister et al. | |
| D493,518 | S | 7/2004 | McAllister et al. | |
| D501,549 | S | 2/2005 | McAllister et al. | |
| D501,550 | S | 2/2005 | McAllister et al. | |
| D506,545 | S | 6/2005 | McAllister et al. | |
| 6,929,803 | B2 | 8/2005 | Wong et al. | |
| D516,714 | S | 3/2006 | McAllister et al. | |
| 7,163,693 | B1 | 1/2007 | Clarke et al. | |
| 7,217,381 | B2 * | 5/2007 | Sowden | ........................ 264/250 |
| 2001/0008637 | A1 | 7/2001 | Hochrainer et al. | |
| 2003/0029558 | A1 | 2/2003 | Hochrainer et al. | |
| 2003/0049311 | A1 | 3/2003 | McAllister et al. | |
| 2003/0068369 | A1 | 4/2003 | McAllister et al. | |
| 2003/0194428 | A1 | 10/2003 | Miller et al. | |
| 2003/0194429 | A1 | 10/2003 | Miller et al. | |
| 2003/0194430 | A1 | 10/2003 | Miller et al. | |
| 2004/0115256 | A1 | 6/2004 | MacAllister et al. | |
| 2004/0131668 | A1 | 7/2004 | Hochrainer et al. | |
| 2004/0166153 | A1 | 8/2004 | McAllister et al. | |
| 2005/0008690 | A1 | 1/2005 | Miller | |
| 2005/0053648 | A1 | 3/2005 | Chalmers | |
| 2005/0175687 | A1 | 8/2005 | McAllister et al. | |
| 2005/0249807 | A1 | 11/2005 | Brown et al. | |
| 2006/0013869 | A1 | 1/2006 | Ignatious et al. | |
| 2006/0057201 | A1 | 3/2006 | Bonney et al. | |
| 2006/0083784 | A1 | 4/2006 | Ignatious et al. | |
| 2006/0177496 | A1 | 8/2006 | McAllister et al. | |
| 2009/0148518 | A1 | 6/2009 | Brown et al. | |
| 2010/0074947 | A1 | 3/2010 | Brown et al. | |

FOREIGN PATENT DOCUMENTS

| | | | |
|---|---|---|---|
| DE | 3524963 | | 1/1987 |
| DE | 3543956 | | 6/1987 |
| DE | 3727894 | A1 | 3/1989 |
| EP | 0141397 | | 5/1985 |
| EP | 0143524 | | 6/1985 |
| EP | 0384642 | | 8/1990 |
| FR | 1454013 | | 7/1966 |
| FR | 2524311 | | 10/1983 |
| GB | 1108629 | | 0/1698 |
| GB | 1177587 | | 1/1970 |
| GB | 1496737 | | 12/1977 |
| GB | 2025270 | | 1/1980 |
| GB | 2148235 | | 5/1985 |
| GB | 2148841 | | 6/1985 |
| GB | 2172569 | | 9/1986 |
| GB | 2187703 | | 9/1987 |
| GB | 2283912 | | 5/1995 |
| NL | 7610038 | | 3/1978 |
| WO | WO 90/12567 | | 11/1990 |
| WO | WO 92/13521 | | 8/1992 |
| WO | WO 94/09743 | | 5/1994 |
| WO | WO 95/13056 | | 5/1995 |
| WO | WO 95/16438 | | 6/1995 |
| WO | WO 95/17171 | | 6/1995 |
| WO | WO 01/08666 | A1 | 2/2001 |
| WO | WO 02/060384 | A2 | 8/2002 |
| WO | WO 02/060385 | A2 | 8/2002 |
| WO | WO 03/086267 | | 10/2003 |
| WO | WO 2004/010978 | A1 | 2/2004 |
| WO | WO 2004/014304 | | 2/2004 |
| WO | WO 2005/009380 | A2 | 2/2005 |
| WO | WO 2005/039474 | A1 | 5/2005 |
| WO | WO 2005/089726 | A1 | 9/2005 |

OTHER PUBLICATIONS

Cuff et al., Pharmaceutical Technology, Jun. 1998 pp. 96-106.
DE 3727894 A1 English Abstract, Mar. 2, 1989.
BE 900950 English Abstract, Apr. 30, 1985.
FR 2524311 English Abstract, Oct. 7, 1983.
FR 1454013 English Abstract, Jul. 22, 1966.
NL 7610038 English Abstract, Mar. 13, 1978.
"Sweetening the Pill." www.carclo.co.uk, *Engineering*, Sep. 2006.
English language Abstract of DE 3524963.
English language Abstract of DE 3543956.

* cited by examiner

METHOD AND APPARATUS FOR MANUFACTURING FILLED LINKERS

PRIORITY

This application claims priority to U.S. Provisional Patent Application No. 60/960,785 filed Oct. 15, 2007 and U.S. Provisional Patent Application No. 61/000,898 filed Oct. 30, 2007.

FIELD OF THE INVENTION

This invention relates to methods of making pharmaceutical dosage forms and, more particularly, to manufacturing a filled linker unit for multipart capsules using injection molding.

BACKGROUND OF THE INVENTION

Various types of pharmaceutical dosage forms are known for oral dosing. Such capsules generally comprise an envelope wall of a pharmaceutically acceptable, e.g. orally ingestible, polymer material such as gelatin, although other materials for capsule walls, e.g. starch and cellulose based polymers are also known. Such capsules generally have soft walls made by forming a film on a capsule former, which is then allowed to dry. Rigid walled capsules made by injection molding are also known; see for example U.S. Pat. No. 4,576,284, U.S. Pat. No. 4,591,475, U.S. Pat. No. 4,655,840, U.S. Pat. No. 4,738,724, U.S. Pat. No. 4,738,817, and U.S. Pat. No. 4,790,881 (all to Warner Lambert). These disclose specific constructions of capsules made of gelatin, starch and other polymers, and methods of making them by injection molding of hydrophilic polymer, e.g., water mixtures. U.S. Pat. No. 4,576,284 specifically discloses such capsules provided with a cap which closes the capsule, which is formed in situ on the filled capsule by molding. U.S. Pat. No. 4,738,724 discloses a wide range of rigid capsule shapes and parts.

Multi-compartment capsules, including those of the type where each compartment has different drug release characteristics or, for example, contains a different drug substance or formulation, are also known; see for example U.S. Pat. No. 4,738,724 (Warner-Lambert), U.S. Pat. No. 5,672,359 (University of Kentucky), U.S. Pat. No. 5,443,461 (Alza Corp.), WO 9516438 (Cortecs Ltd.), WO 9012567 (Helminthology Inst.), DE-A-3727894, BE 900950 (Warner Lambert), FR 2524311, NL 7610038 (Tapanhony N V), FR 28646 (Pluripharm), and U.S. Pat. No. 3,228,789 (Glassman), U.S. Pat. No. 3,186,910 (Glassman), among others. U.S. Pat. No. 4,738,817, U.S. Pat. No. 3,228,789, and U.S. Pat. No. 3,186,910 each disclose a multicompartment capsule made of a water-plasticized gelatin.

Pharmaceutical dosage forms that comprise a matrix of a solid polymer, in which a drug substance is dispersed, embedded or dissolved as a solid solution are also known. Such matrixes may be formed by an injection molding process. This technology is discussed in Cuff G. and Raouf F., Pharmaceutical Technology, June 1998, p. 96-106. Some specific formulations for such dosage forms are, for example disclosed in U.S. Pat. No. 4,678,516; U.S. Pat. No. 4,806,337; U.S. Pat. No. 4,764,378; U.S. Pat. No. 5,004,601; U.S. Pat. No. 5,135,752; U.S. Pat. No. 5,244,668; U.S. Pat. No. 5,139,790; U.S. Pat. No. 5,082,655 among others, in which a polyethylene glycol ("PEG") matrix is used and solid dosage forms are made by injection molding.

The content of the above-mentioned background patent publications are incorporated herein by way of reference.

See, also for example, WO 01/08666, WO 02/060385, US 2004/0115256, US 2006/0049311, WO 02/060384, US 2003/0068369, US 2004/0166153, WO 04/010978, US 2006/0057201, WO 05/009380, US 2005/0175687, WO 05/089726, US 2005/0249807, U.S. 60/968,383, and U.S. 61/061,275, each of the disclosures of which are incorporated herein by way of reference.

Also, the content of PCT/EP00/07295 entitled "MULTI-COMPONENT PHARMACEUTICAL DOSAGE FORM" assigned to the assignee of the present application is incorporated herein by way of reference.

SUMMARY OF THE INVENTION

In one aspect of the present disclosure, a method of manufacturing a linker is provided. The linker includes a jacket radially confining a preformed tablet having an outer surface. The method includes grasping the tablet with a plurality of pincers and positioning the grasped tablet and the pincers in a mold. The method also includes injecting jacket material to substantially cover the outer tablet surface and the pincers to form the jacket. The method further includes extracting the jacketed tablet from the mold and removing the pincers from the jacketed tablet.

In another aspect of the present disclosure, a molding apparatus for forming a linker having a preformed tablet and an injection molded jacket is provided. The molding apparatus includes an inner surface defining an interior and a plurality of pincers movable between a first position wherein the plurality of pincers are disposed within the interior and a second position wherein the plurality of pincers are not disposed within the interior.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the disclosure.

BRIEF DESCRIPTION OF THE DRAWINGS

The invention will now be described by way of example with reference to.

DETAILED DESCRIPTION

Reference will now be made in detail to the present embodiments of the invention, examples of which are illustrated in the accompanying drawings.

In accordance with the present disclosure, a method is disclosed for making a linker configured to connect two dosage form units from the group including capsule compartments and closure caps with the linker holding a solid drug substance. Specifically, the linker includes a preformed solid drug substance in tablet form, the tablet having a longitudinal axis and being substantially cylindrical with opposed axial end faces. The linker further includes a jacket formed around and radially confining the preformed tablet, the jacket having an outer wall with longitudinal ends, one or both of the jacket ends being opened for dispensing the drug substance from the respective end faces. The linker may further include the jacket outer wall having snap-fit elements adjacent each longitudinal end configured to interact with complementary snap-fit elements on capsule compartments and/or closure caps.

Figure 1:
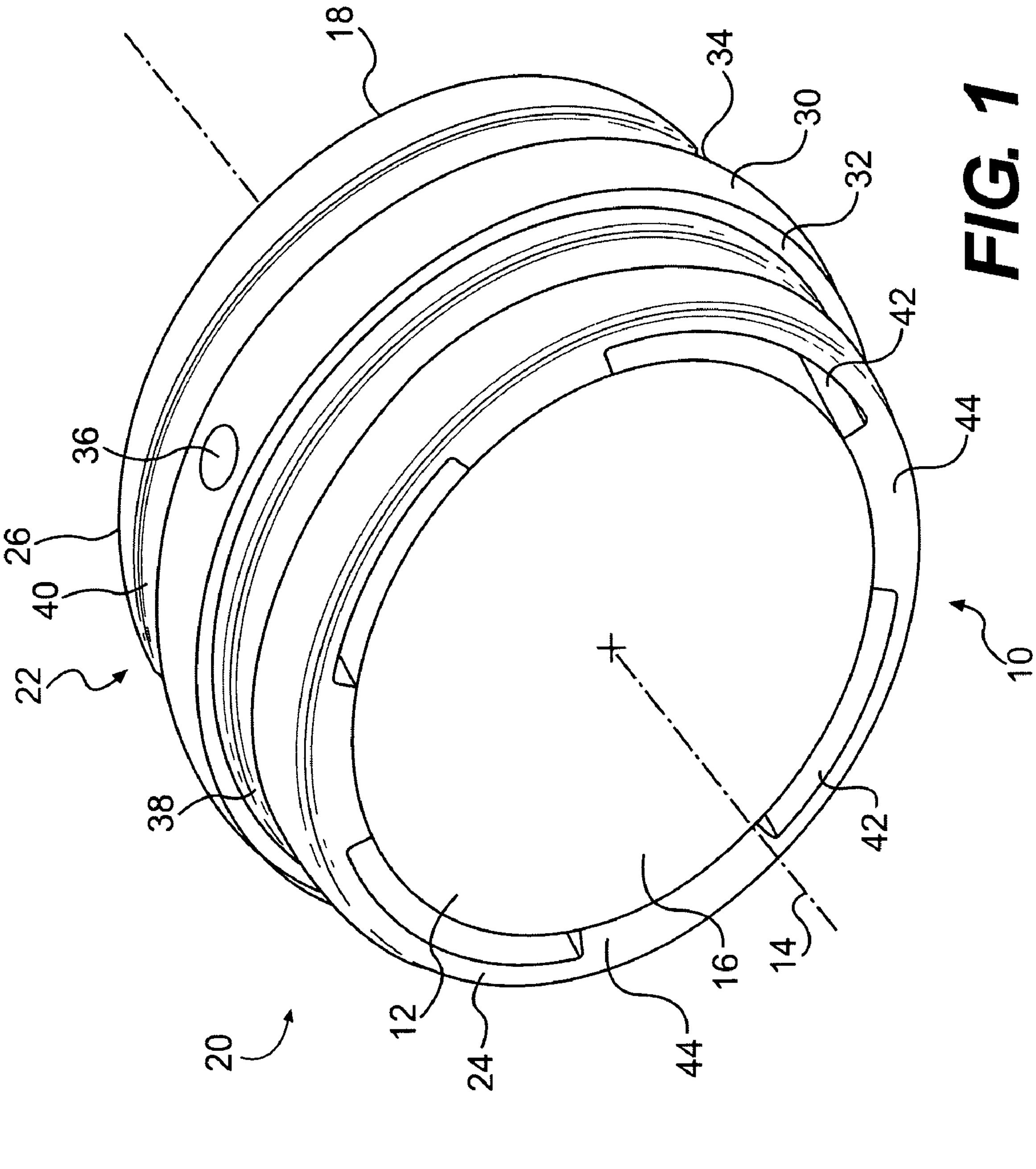
FIG. 1 which is a perspective view of an exemplary linker made in accordance with the method and apparatus of the present disclosure.
Figure 2:
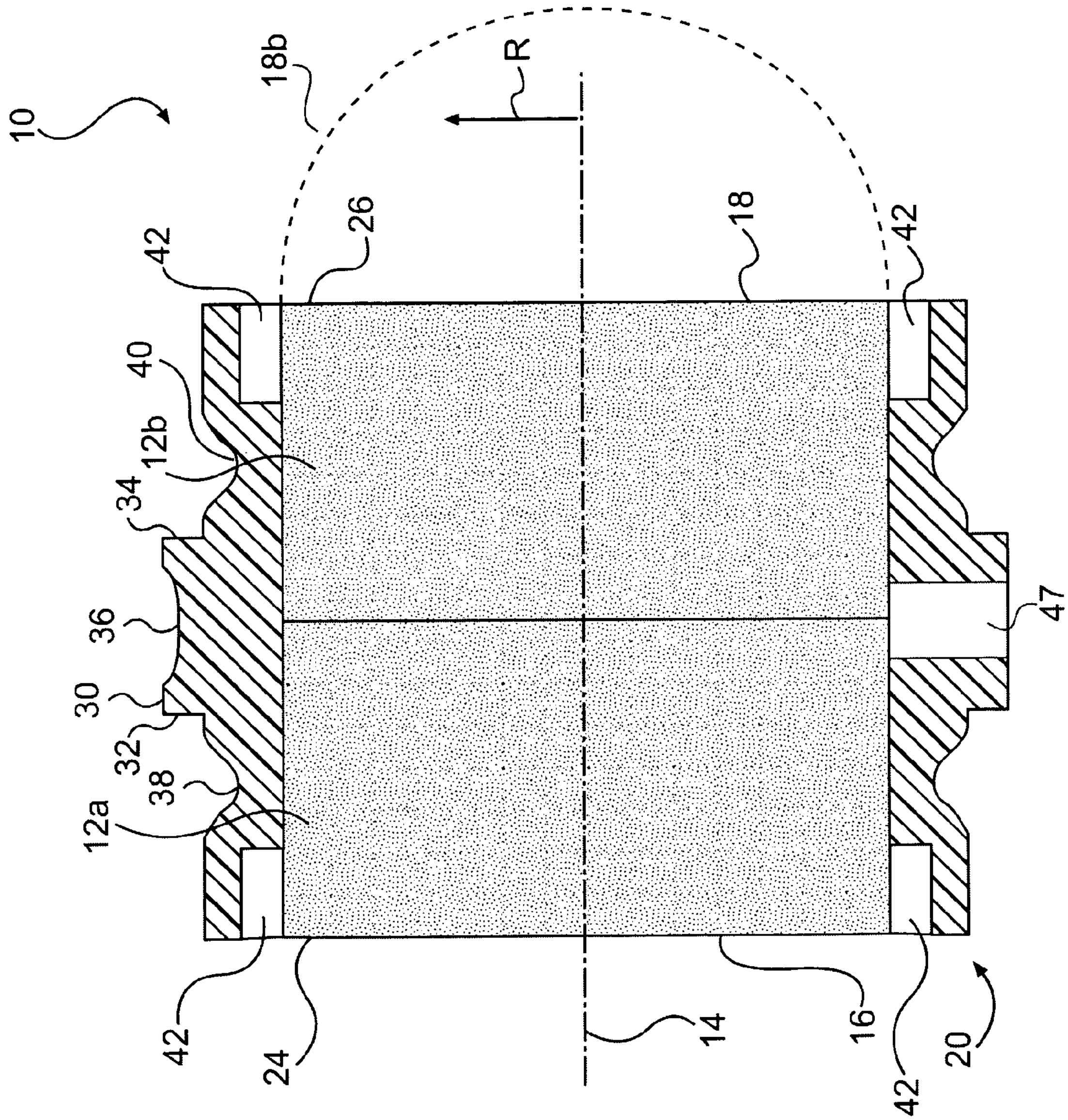
FIG. 2 is a cross section view of the linker of FIG. 1.
Figure 3:
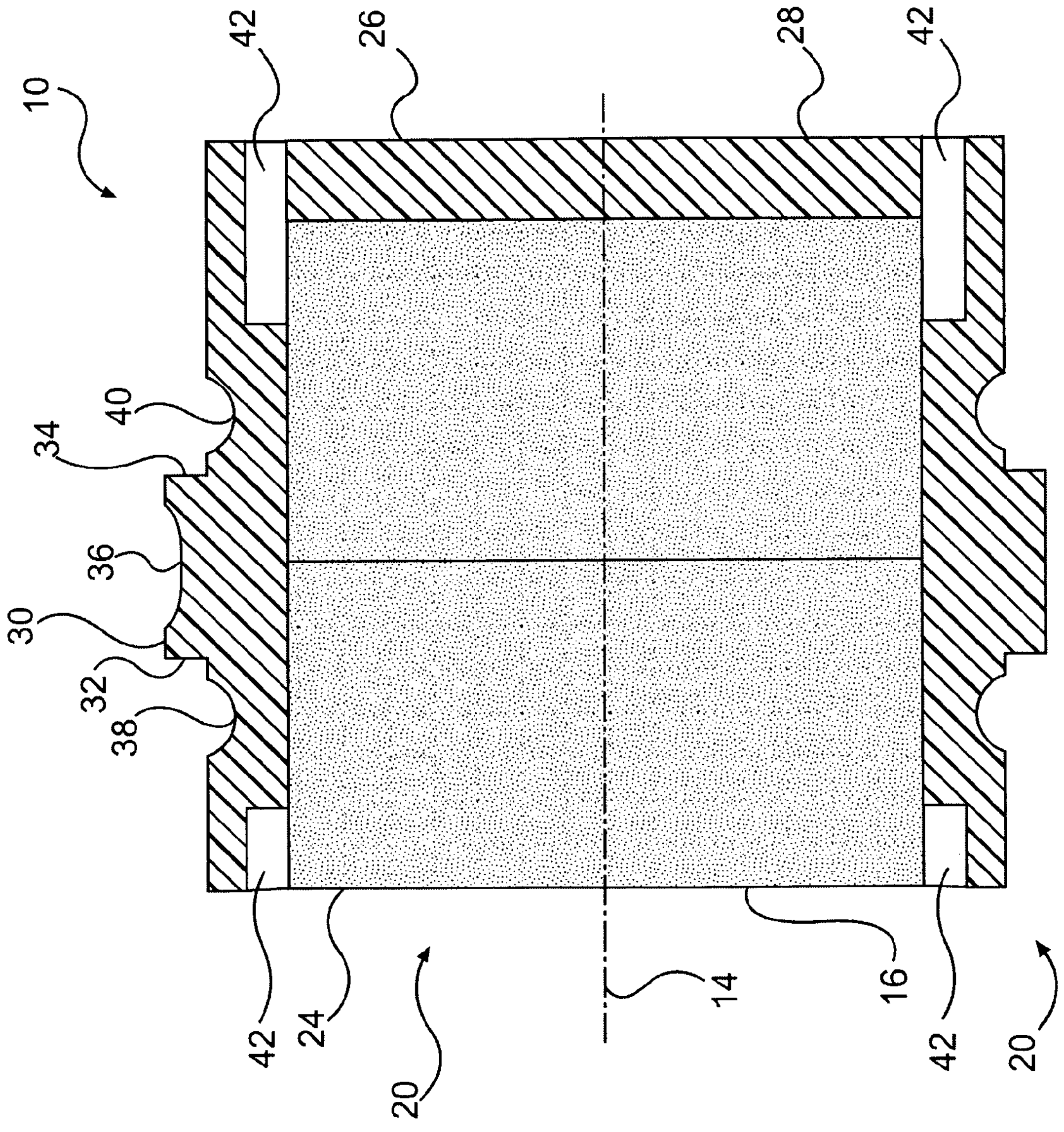
FIG. 3 is a cross section view variation of the linker of FIG. 1.

FIGS. 1-3 illustrate an exemplary linker 10 having a solid tablet and a jacket that may be made using the methods of the present disclosure to be described hereinafter with reference to FIGS. 6-9. In FIGS. 1-3, linker 10 includes a tablet 12, which may be substantially cylindrical, having an axis 14 and opposed axial end faces 16 and 18. Tablet 12 preferably is preformed outside linker 10 by processes such as dry compacting, casting, or other process known in the art. Tablet 12 can be composed of a single drug substance or a multi-part configuration can be used with a plurality of joined solid drug substance parts (as shown in FIG. 2 as first and second drug substance parts 12*a*, 12*b*). The drug substances in the respective plurality of drug substance parts may differ in composition and/or release characteristics, and can be appropriately indicated as such by coloration to ensure correct assembly into dosage forms.

Drug substances for use in dosage forms suitable for being administered orally to a patient can be retained within a capsule or cap unit interconnected with linker 10 can include any suitable or conventional form, such as, for example, a powder, granules, compact, microcapsules, solid form, gel, syrup, or liquid, provided that the capsule or cap unit wall material is sufficiently inert to the liquid content of the latter three forms. Additionally the drug substances must be sufficiently compatible with the solid drug substance parts 12*a*, 12*b* and/or tablet 12 if a respective closed jacket end wall, e.g., wall 28 as discussed below, is not provided.

With continued reference to FIGS. 1-3, linker 10 includes a jacket 20 with a generally cylindrical outer wall 22 and respective axial ends 24, 26. Jacket 20 is injection molded around tablet 12 in order to leave one or both jacket ends 24, 26 open and to expose tablet end face 16 and/or 18. An exposed tablet end face 16 and/or 18 may enable dispersion and dissolution of the tablet drug substance(s) once a connected capsule and/or cap unit (not shown) has been breached, such as, for example, changing shape, form, or structure within a gastro-intestinal environment, e.g., dispersing, dissolving, disintegrating, swelling, being partially or completely soluble, or otherwise changeable when exposed to stomach pH and/or in intestine pH.

For example, in linker 10, shown in cross-section in FIG. 2, both jacket ends 24, 26 are open to expose tablet end faces 16, 18 for drug substance dissolution and/or dispersion, when an interconnected capsule and/or cap unit (not shown) is breached. In comparison, FIG. 3 shows a variation in jacket 20 with a wall 28 closing off jacket end 26, to substantially prevent the drug substance in tablet 12 from dissolving and/or dispersing therethrough. Wall 28 can preferably be integrally formed with the remainder of jacket 20 via common injection molding process. In both variations the injection molded jacket material radially confines a tablet 12 (radial direction being depicted in FIG. 2 as indicated by arrow R).

Moreover, if dissolution/dispersion of an increased quantity of a solid drug substance is desired, tablet end faces 16 and/or 18 may be shaped with a rounded, extended face such as 18*b*. Other configurations of an extended tablet end face that may be desirable include those depicted in FIG. 6 as 18*a* and 18*c*. Extended face 18*a* may be achieved by including recess lands 104 or 106 as in tablet 102 described in more detail below (see FIGS. 4-5) and jacket tabs 116 or 118. A "mushroom" shaped extended end face configuration 18*c* is yet another alternative. (See FIG. 6)

Jacket 20 may also include a raised band 30 circumferentially formed on the periphery of outer jacket wall 22, preferably midway between longitudinal ends 24 and 26. Band 30 includes opposed side surfaces 32, 34 configured for abutting contact with the wall ends of dosage form units, e.g., a capsule and/or cap, interconnected with linker 10. Raised band 30 may further include one or more concave depressions 36 to accommodate injection molding overflow as is known in the art. Jacket 20 may further include snap-fit elements 38, 40 formed on an outer surface of jacket wall 22 between raised band 30 and respective jacket longitudinal ends 24, 26. As shown in FIGS. 1-3, both snap-fit elements 38, 40 are circumferential grooves configured and dimensioned to engage complementary circumferential ridge or "bead" elements on the inner surfaces of the respective capsule and/or cap unit. It is contemplated that jacket 20 may not include raised band 30, i.e., the outer periphery of jacket 20 may be "flush" with remainder of outer jacket wall 22, and, as such, depressions 36 may be formed directly within outer jacket wall 22. It is also contemplated that outer jacket wall may not include snap-fit elements 38, 40 and may include a radial outer wall thereof having any contour.

Additionally, jacket 20 may include one or more radially directed apertures 47 (see FIG. 2) to provide a direct path for controlled, relatively early dispersion of the drug substance of tablet 12, prior to tablet end faces 16, 18 being exposed when an interconnected capsule and/or end/cap unit (not shown) is breached. Apertures 47 may be sealed with a rapidly dissolving thin film or coating (not shown) to prevent contamination of the drug substance of tablet 12.

As will be further described below, manufacturing linker 10 may involve the use of pincers, e.g., gripping elements, to position and hold tablet 12 with respect to a mold while injecting the jacket material to surround tablet 12, and the pincers, during an injection molding process. As such, a plurality of slots 42 may be formed adjacent one or both jacket ends 24, 26 when the pincers are removed from tablet 12 according the molding processes of the present disclosure as discussed in more detail below. That is, slots 42 may be an artifact of the pincers and may be formed as a result of jacket 20 being injection molded around tablet 12 and the pincers. Slots 42 may be radially spaced about axis 14 and may or may not be equally spaced about axis 14. Slots 42 may each extend only partially around the circumference of tablet 12. It is contemplated that if tablet 12 includes an extended face 18*a*, 18*b*, 18*c*, slots 42 may be omitted adjacent to the extended end face as will be explained in more detail below. Linker 10 may further include a plurality of flanges 44 (referring to FIG. 1) interspaced between adjacent ones of slots 42. Flanges 44 may engage the outer wall of tablet 12 and may be configured at least to some degree to secure tablet 12 with jacket 20.

Figure 4:
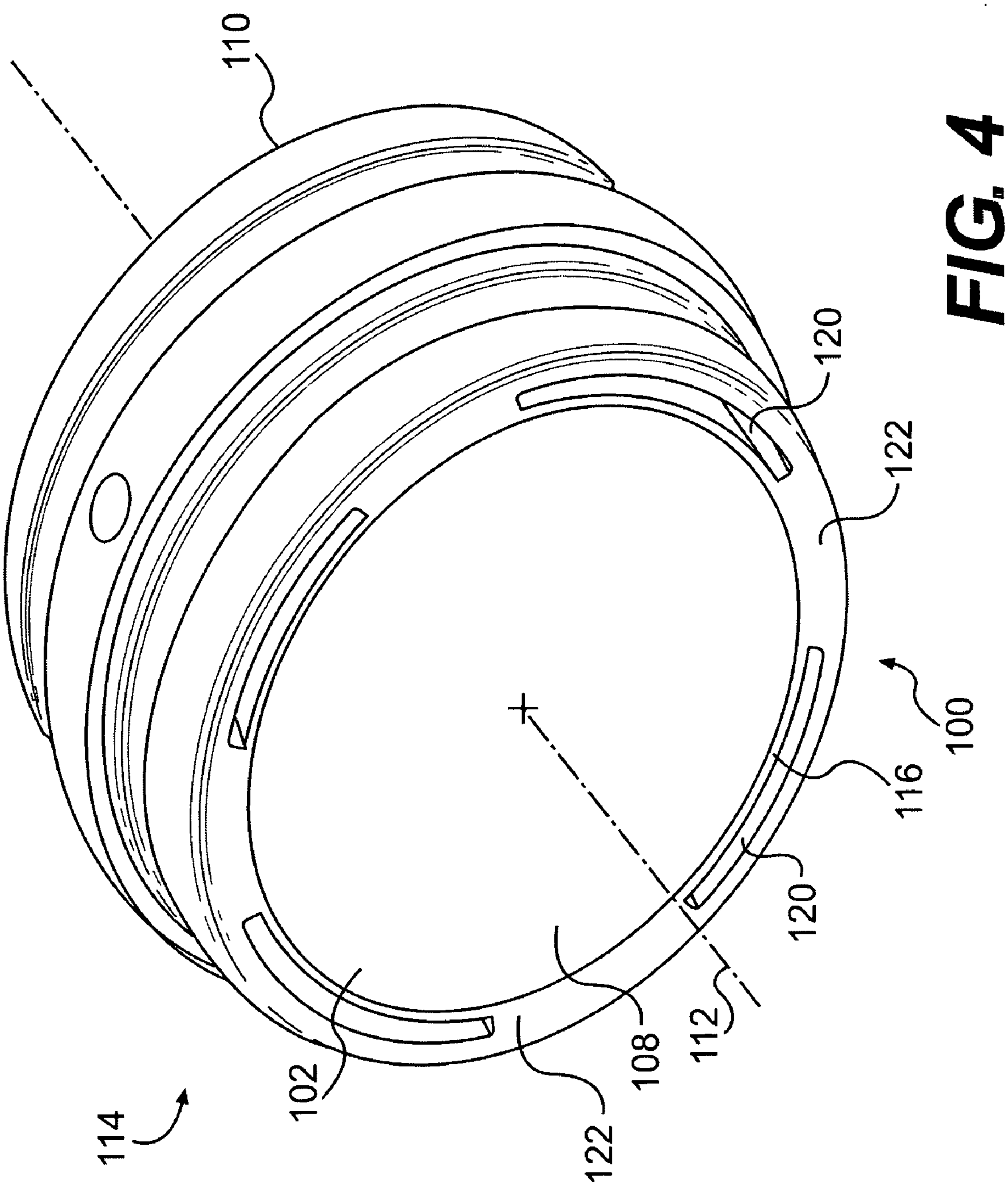
FIG. 4 is a perspective view of another exemplary linker made in accordance with the method and apparatus of the present disclosure.
Figure 5:
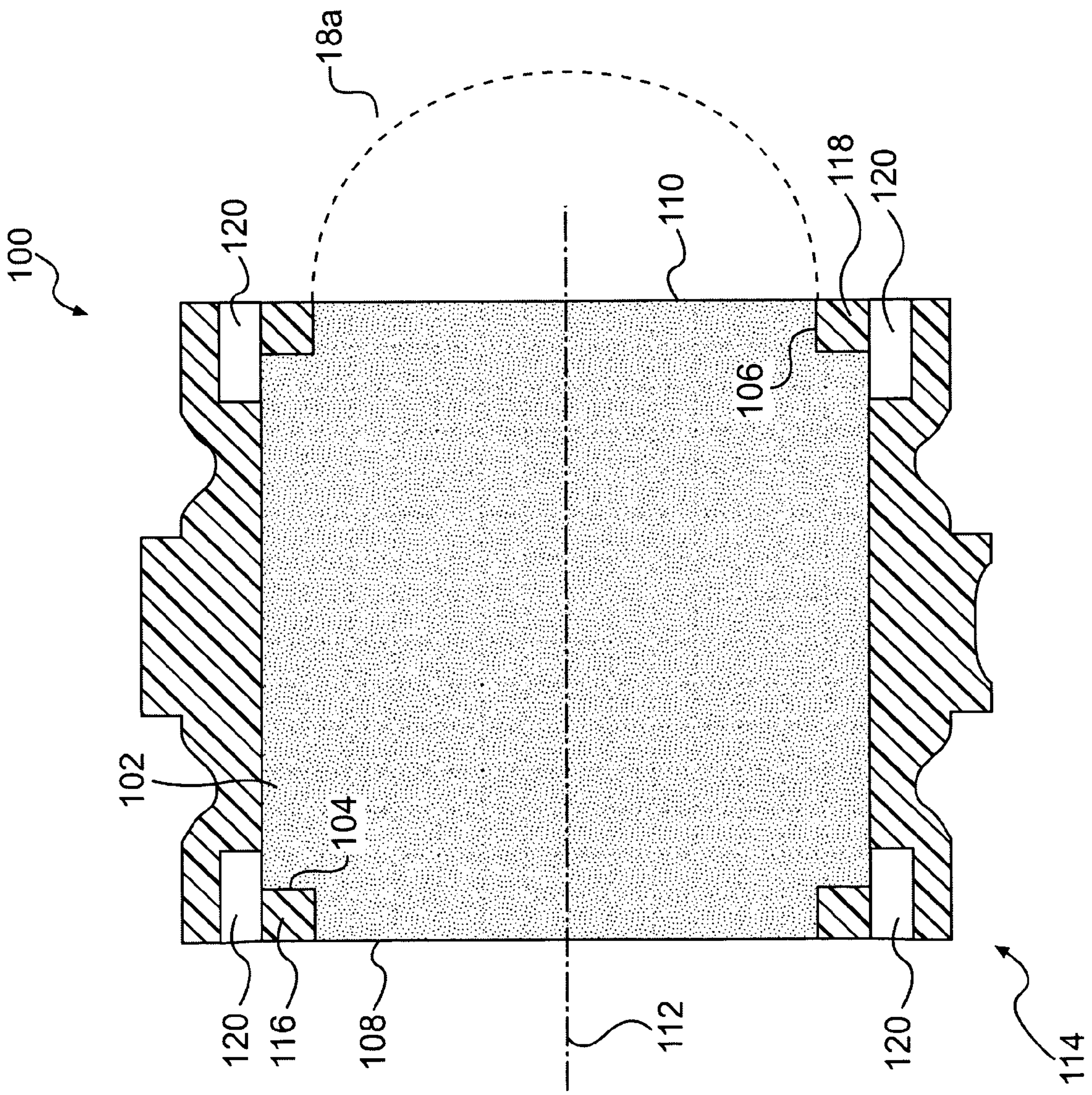
FIG. 5 is a cross section view of the linker of FIG. 4.

FIGS. 4-5 illustrate another exemplary linker 100 having a solid tablet and a jacket that may be made using the methods of the present disclosure as described hereinafter with reference to FIGS. 6-9. In FIGS. 4-5, linker 100 includes tablet 102, which may each be similar to linker 10 and tablet 12 described above with reference to FIGS. 1-3. As such, only the differences will be explained below.

Referring to FIG. 5, tablet 102, as shown in cross section, may include recessed lands 104, 106 formed around respective perimeters of each of axial end faces 108, 110. Recessed lands 104, 106 may embody a reduced radial dimension with respect to axis 112. Jacket 114 may include circumferential jacket tabs 116, 118, which may be configured to confine tablet 102 at least to some degree and secure jacket 114 with tablet 102. As will be described in more detail below, recessed lands 104, 106 may receive jacket material during an injection molding process. It is also contemplated that tablet 102 may include an extended end face 18*a*, as mentioned above.

With reference to FIGS. 4-5, linker 100 may include slots 120. Similar to slots 42, slots 120 may be formed by pincers holding tablet 102 with respect to a mold while injecting the jacket material to surround tablet 102 and the pincers during an injection molding process. Slots 120 may extend along an outer wall of tablet 102 a distance greater than the axial length of recessed lands 104, 106 and, thus, may be configured to contact the radial outer most wall of tablet 102. Slots 120 may each extend only partially around the circumference of tablet 102. Linker 100 may also include a plurality of flanges 122 interspaced between adjacent ones of slots 120. Because tablet 102 includes recessed lands 104, 106, jacket tabs 116, 118 may be disposed radially inside each of slots 120. It is contemplated that the pincers may, alternatively, engage and grasp recessed lands 104, 106 and not the outer wall of tablet 102.

Molded jackets 12 and 114 of Linkers 10 and 100 may each be made of a transitional polymer. A transitional polymer is a polymer that changes shape, form, or structure within a gastro-intestinal environment, e.g., dispersible, dissolvable, disintegrable, breachable, swellable, partially or completely soluble, fracturable, or otherwise changeable when exposed to stomach pH and/or in intestine pH. Suitable polymers for linker 10 may include: polyvinyl alcohol (PVA), natural polymers (such as polysaccharides like pullulan, carrageenan, xanthan, chitosan or agar gums), polyethylene glycols (PEG), polyethylene oxides (PEO), mixtures of PEGS and PEOS, hydroxypropylmethylcellulose (HPMC), methylcellulose, hydroxyethylcellulose, hydroxyethyl methylcellulose, hydroxypropylcellulose, methacrylic acid copolymer (such as Eudragit E™, Eudragit L™ and/or Eudragit S™), ammonium methacrylate copolymers (such as Eudragit RL™ and/or Eudragit RS™), carboxymethylcellulose, povidone (polyvinyl pyrrolidone), polyglycolysed glycerides (such as Gelucire 44/14™, Gelucire 50/02™, Gelucire 50/13™ and Gelucire 53/10™), carboxyvinyl polymers (such as Carbopols™), polyoxyethylene-polyoxypropylene copolymers (such as Poloxamer 188™), and acrylic and/or methacrylic acid-based polymers. The Eudragit™ polymers discussed above for example are extrudable and may for example be plasticised with e.g. triethyl citrate, or glyceryl monostearate.

Preferred polymers are orally ingestible polymers and include hydroxypropyl methylcellulose acetate succinate (HPMC-AS), polyvinyl alcohol, hydroxypropyl methyl cellulose, and other cellulose-based polymers. Preferred polymers also include polymer materials which preferentially dissolve or disintegrate at different points in the digestive tract. Such polymers include the known acrylic and/or methacrylic acid-based polymers which are transitional in intestinal fluids, e.g. the Eudragit series of commercially available polymers. Examples of these include Eudragit E™, such as Eudragit E 100™ or Eudragit 4135F™, which preferentially dissolves in the more acid pH of the stomach, or enteric polymers such as Eudragit L™ and/or Eudragit S™ which preferentially dissolve in the more alkaline pH of the intestine, and preferred polymers also include polymers which dissolve slowly, e.g. at a predetermined rate in the digestive tract, such as Eudragit RL™ e.g. Eudragit RL 100™, and/or Eudragit RS™ e.g. Eudragit R100™, and/or blends of such Eudragit™ polymers.

The polymers may include other substances to modify their properties and to adapt them to various applications, including, for example, the following general classes of substances: surfactants, such as Polysorbate 80™, sodium lauryl sulphate, and Polyoxyl 40™ hydrogenated castor oil; absorption enhancers, such as Labrasol™, Transcutol™; glidants, such as stearyl alcohol, talc, magnesium stearate, silicon dioxide, amorphous silicic acid, fumed silica, Simeticone™; plasticizers, such as triethyl citrate, acetyl triethyl citrate, tributyl citrate, acetyl tributyl citrate, glyceryl monostearate, diethyl phthalate, dibutyl phthalate, propylene glycol, triacetin and castor oil; substances for release modification, such as ethyl cellulose and cellulose acetate phthalate; disintegrants, such as sodium starch glycollate, croscarmellose sodium, crospovidone (cross-linked polyvinyl pyrrolodone), coloring agents, flavoring agents and sweetening agents.

In accordance with the present disclosure, a molding apparatus is disclosed for forming linkers 10, 100 having a preformed tablet 12, 102 and an injection molded jacket 20, 114. Specifically, the apparatus includes an inner surface defining an interior. The apparatus further includes a plurality of pincers movable between a first position wherein the plurality of pincers are disposed within the interior and a second position wherein the plurality of pincers are not disposed within the interior.

Figure 6:
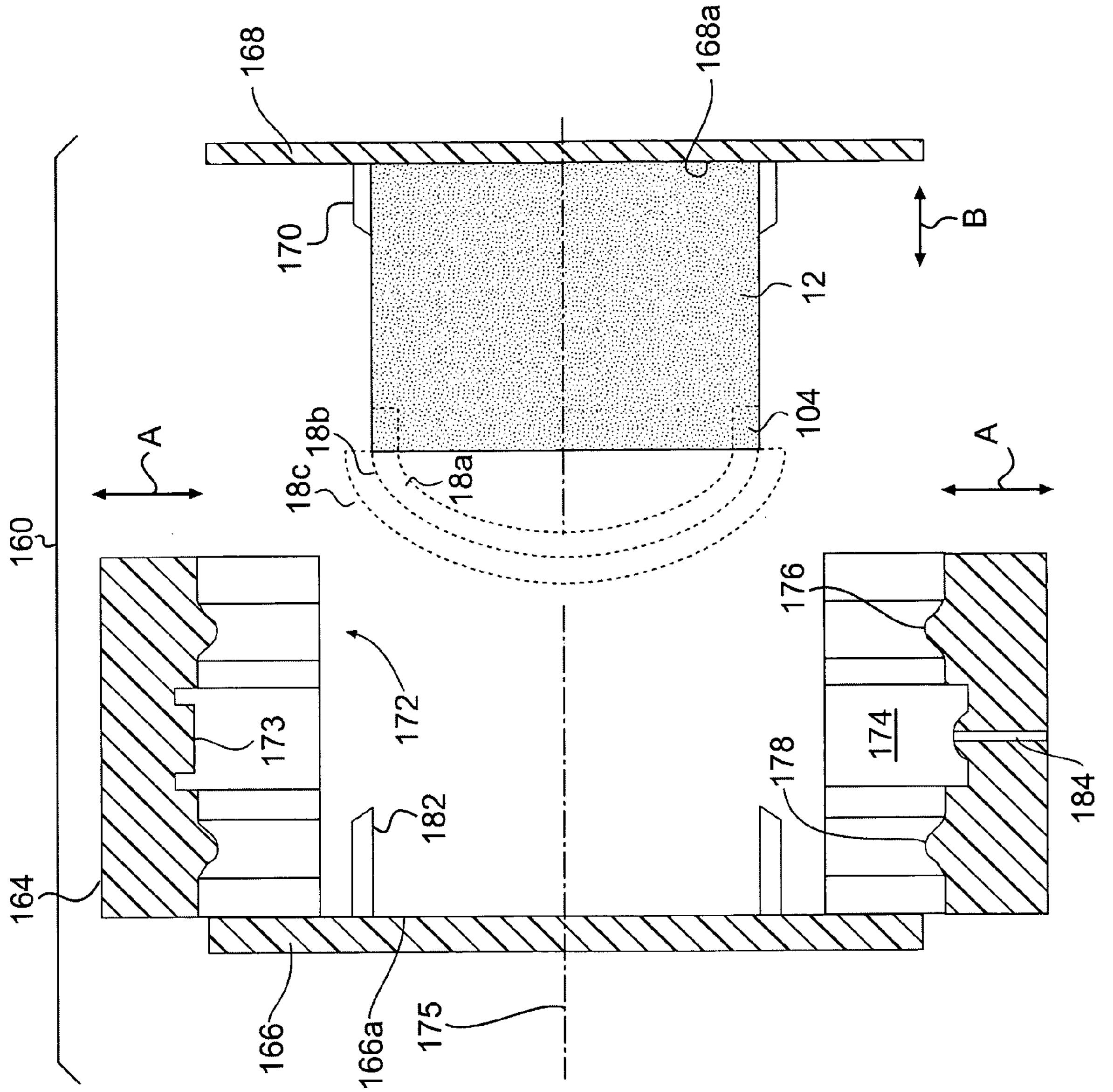
FIG. 6 is a diagrammatic illustration of an exemplary mold apparatus in a first configuration in accordance with the present disclosure.
Figure 7:
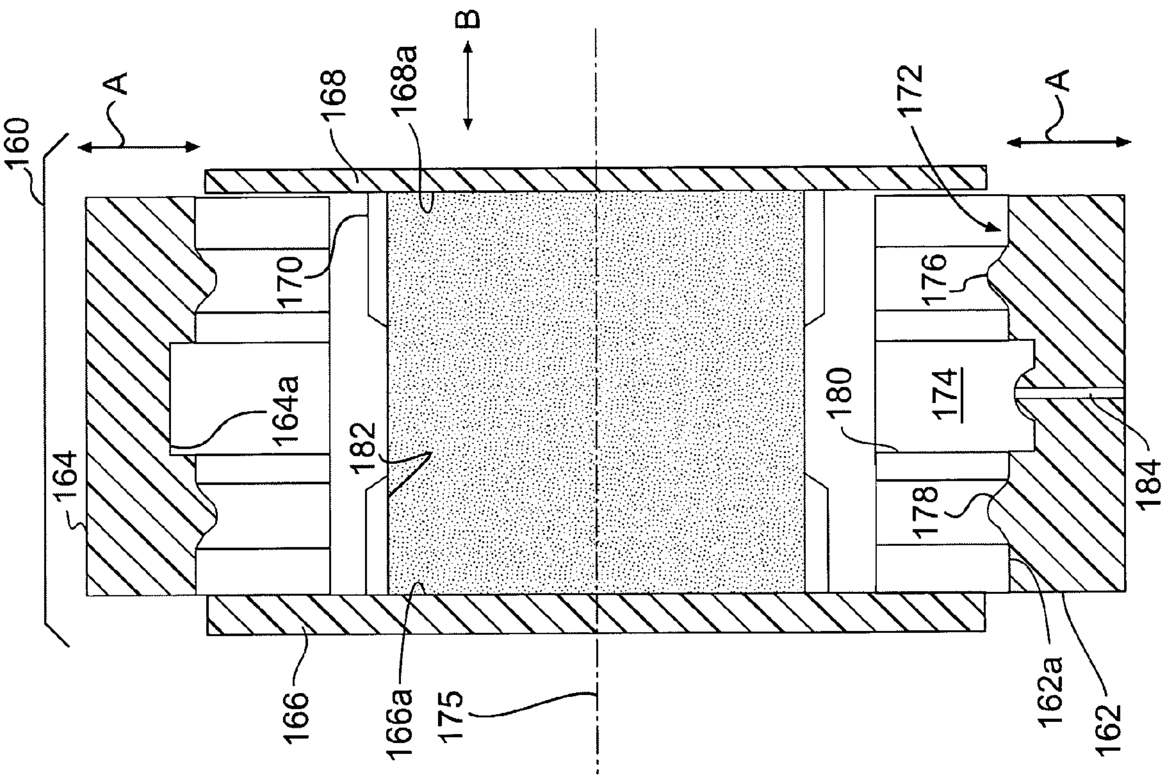
FIG. 7 is a diagrammatic illustration of the exemplary mold apparatus of FIG. 6 in a second configuration.

Referring to FIGS. 6-7, a molding apparatus 160 may include a first side wall 162 having an inner surface 162*a*, a second side wall 164 having an inner surface 164*a*, a first end wall 166 having an inner surface 166*a*, and a second end wall 168 having an inner surface 168*a*. Walls 162, 164, and 168 may be movable with respect to first end wall 166 between a first configuration (as illustrated in FIG. 6) and a second configuration (as illustrated in FIG. 7). First end wall 166 may be generally fixed. First and second side walls 162, 164 may be movable with respect to first end wall 166 in a first direction A and second end wall 168 may be movable with respect to first end wall 166 in a second direction B. The relative movement of molding apparatus 160 will be further described below.

Second end wall 168 may include a first plurality of pincers 170 that may be configured to selectively engage, e.g., grasp, a tablet, e.g., tablet 12 and/or 102, on a first axial end thereof. Second end wall 168 may be configured to maneuver and position the grasped tablet with respect to walls 162, 164, and 166. First plurality of pincers 170 may include any conventional gripping elements configured to releasably grasp and hold the tablet via, for example, linkage system. It is contemplated that any portion of first plurality of pincers 170 may engage the tablet, that is, the full gripping length of the pincers may or may not engage the outer surface of the tablet. It is also contemplated that first plurality of pincers 170 may engage the tablet by flexing in a radial direction so as to deflect and subsequently grasp and support the tablet.

As described above and illustrated in FIG. 6, tablet 12 may include an extended end, e.g., extended end faces 18*a*, 18*b*, 18*c*. If so, it is contemplated that second pincers 182, described in more detail below with reference to FIG. 7, may be selectively omitted and first end wall 166 may include a complimentary recess formed therein (not shown) with respect to an extended end of tablet 12. It is also contemplated that an extended end 18*a*, 18*b*, 18*c* may be engage the complimentary recess formed in first end wall 166 so as to expose the extended end of tablet 12 after linker 20 is formed around tablet 12.

Referring to FIG. 7, molding apparatus 160, in the second configuration, and in particular walls 162, 164, 166, 168, may include an inner surface 172 defining an interior 174 of molding apparatus 160. Molding apparatus 160 is illustrated in FIG. 7 without the tablet and second end wall 168 for clarification purposes. The contour of inner wall 172 may include any shape and may be configured to provide a desired shape for the radial outer wall of linker 10 and/or 100. For example, inner wall 164 may be substantially cylindrical having an longitudinal axis 175 and may include ridges 176, 178 configured to form snap-fit elements 38, 40 (see FIGS. 2, 3, and/or 5), may include a relief 180 configured to form raised band 30 (see FIGS. 2, 3, and/or 5), and may include a pin shaped element 173 configured to form aperture 47 (see FIG. 2), and/or may include any other types of features configured to produce elements on the radially outer wall of the formed linker. Each of first and second end walls 166, 168 may form an end wall portion of the inner surface 172 and each of side walls 162, 164 may form approximately half of the radial wall portion of inner surface 172. It is contemplated that any or all of walls 162, 164, 166, 168 may include porting, channeling, and/or passageways formed therein configured to direct and contain molten or liquid material during an injection molding process toward interior 174.

Molding apparatus 160 may further include a second plurality of pincers 182 extending from first end wall 166 into interior 174, second plurality of pincers 182 may be cantilevered with respect to first end wall 166, or separately controllable by an actuating mechanism (not shown). Second plurality of pincers 182 may be fixed or movable with respect to first end wall 166 and may be configured to engage and/or support the tablet at a second end thereof, opposite the end engaged by first plurality of pincers 170. Second plurality of pincers 182 may be configured to flex in a radial direction with respect to longitudinal axis 175 so as to deflect and subsequently grasp and support the tablet with respect to molding apparatus 160. It is contemplated that the second plurality of pincers 182 may be omitted from molding apparatus 160 and the tablet may be supported via only the first plurality of pincers 170.

First plurality of pincers 170 may selectively and automatically grasp a tablet and second side wall 168 may selectively and automatically maneuver and position the tablet with respect to first end wall 166. The longitudinal axis of the tablet may substantially align with longitudinal axis 175. First plurality of pincers 170 may apply a force to the tablet in a direction aligned with longitudinal axis 175, that force may be transferred into a radial force acting on second plurality of pincers 182, and may deflect one or more of second plurality of pincers 182. First plurality of pincers 170 may cease application of the force and the deflection of one or more of second plurality of pincers may produce radial and/or axial forces with respect to the tablet to support the tablet with respect to first end wall 166. It is contemplated that second end wall 168 and first plurality of pincers 170 may be configured to similarly grasp a tablet located within a bin or on a conveyor.

First and second side walls 162, 164 may be moved in direction A to form interior 174 around the tablet. That is, interior 174 may be sealed between first and second side walls 162, 164 and first and second end walls 166, 168 so as to define a space between the tablet and inner surface 172 within which jacket material may be injection molded. It is contemplated that jacket material may be injected via channel 184 into the space between the tablet and inner surface 172 formed by relief 180. The jacket material flows within the space, surrounds the tablet and first and second plurality of pincers 170, 182 and fills the features of the contour of inner surface 172. Injection molding processes are well known in the art and, thus, are not further described. Upon solidification of the jacket material, the formed linker, e.g., linker 10 or 100, may be removed from molding apparatus 162 by retracting first and second side walls 162, 164 in direction A, retracting first plurality of pincers 170 along with the molded linker in direction B thereby disengaging the formed linker from the second plurality of pincers 182. Thereafter, first plurality of pincers 170 may be removed from the formed linker.

It is contemplated that the tablet may be positioned within interior 174 at any desired location and that first and second plurality of pincers 170, 182 may be sized and dimensioned so as to provide any desired forces to grasp, maneuver, locate, and/or support the tablet within interior 174. It is also contemplated that the desired size and dimension of first and second plurality of pincers 170, 182 may be a function of the relative rigidity and/or compression strength of the tablet. It is also contemplated that first and second pincers 170, 182 may engage and extend any distance along the outer radial wall of the tablet. The relative position of the tablet within interior 174 may affect the resulting shape and configuration of the jacket injection molded about the tablet. It is further contemplated that molding apparatus 160 may be configured to support more than one, e.g., two or more tablets, and injection mold jacket material around the two or more tablets via the same injection molding process.

In the molding methods, slots 42 and/or 120 (see FIGS. 1-5) may be formed as artifacts or voids from first and/or second plurality of pincers 170, 182 contacting to support and/or locate the tablet as the molding material is injected into the mold. The first and/or second pincers may be configured and located such that any slots 42, 102 formed in the molded linker do not create a leakage path along the outer radial surface of the tablet, i.e., the first and second pincers may be circumferentially offset so as not form a channel through the linker. As depicted in FIGS. 1 and 4, slots 42 and 120 are axially directed and, after assembly of the dosage form, may be positioned inside of a capsule or cap attachment.

In accordance with the present disclosure, a method of manufacturing is disclosed for forming linkers 10, 100. Specifically, the method of manufacturing includes grasping, via a plurality of first pincers, a tablet, e.g., tablet 12 and/or 102, and positioning the preformed tablet with respect to a molding apparatus. The method also includes positioning the grasped tablet and at least a portion of the plurality of first pincers within a mold interior and injecting a polymer material around the tablet and the plurality of first pincers to form a jacket, e.g., jacket 20 and/or 114. The method further includes extracting the formed linker, e.g., tablet 12 surrounded by jacket 20, and disengaging the plurality of first pincers therefrom.

Figure 8:
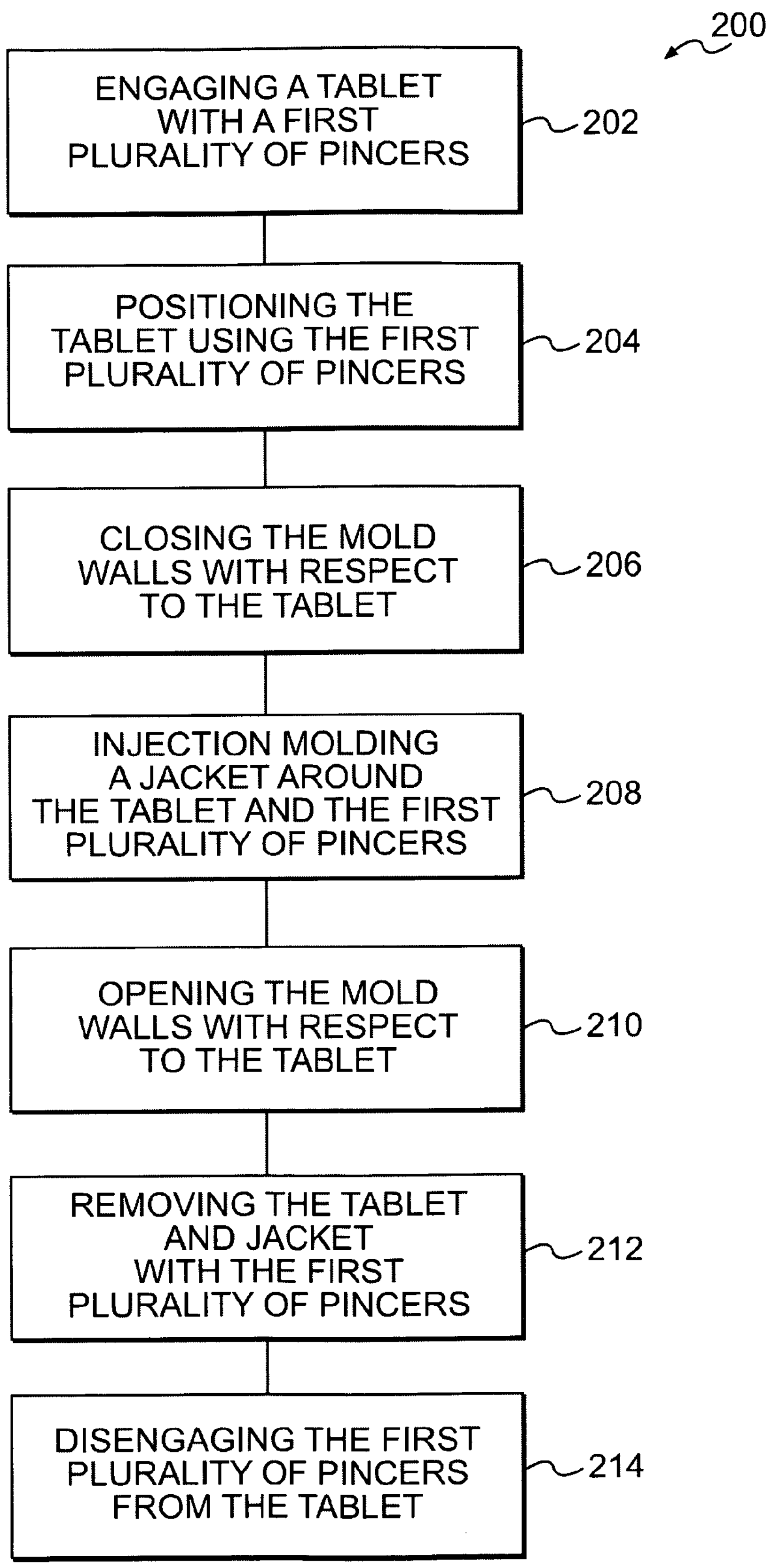
FIG. 8 is a diagrammatic illustration of an exemplary method of manufacturing a linker in accordance with the present disclosure.

Referring to FIG. 8, a method 200 for manufacturing a filled linker may include engaging a tablet with a first plurality of pincers, step 202, and positioning the tablet using the first plurality of pincers, step 204. Method 200 may also include closing the mold walls with respect to the tablet, step 206, and injection molding a jacket around the tablet and the first plurality of pincers, step 208, so as to form a linker, e.g., linker 10 and/or 100. Method 200 may also include opening the mold walls with respect to the tablet, step 210. Method 200 may further include removing the tablet and jacket with the first plurality of pincers, step 212, and disengaging the first plurality of pincers from the tablet, step 210. It is contemplated that one or more of the steps of method 200 may be performed simultaneously and/or that method 200 may be performed continuously, as a batch method, and/or according to any desired frequency. It is also contemplated that method 200 may be automated and/or integrated into a dosage form manufacturing line that may further include interconnecting capsule and/or cap units on respective ends of a manufactured linker. It is further contemplated that two or more methods 200 and/or methods 300 (as described below) may be performed in parallel with one another as part of a manufacturing line producing linkers and/or as part of a manufacturing line producing dosage forms.

Step 202 may include engaging tablet 12 and/or 102 with a first plurality of pincers. As described above with reference to FIG. 6, at least a portion of the first plurality of pincers may grasp tablet 12 and/or 102 about the circumference thereof. Step 202 may include engaging the tablet via any conventional pincers and may be performed either manually, e.g., by a user manually grasping a tablet with the plurality of pincers, or automatically, e.g., by a programmed robot grasping a tablet with the plurality of pincers. It is contemplated that step 202 may include an axial end face of the tablet being in contact with inner surface 168*a* of second end wall 168 when the first plurality of pincers engage the tablet.

Step 204 may include maneuvering the grasped tablet 12 and/or 102 from a first position relatively remote from the mold walls to a second position relatively adjacent the mold walls. Specifically, step 204 may include positioning the tablet with respect to first end wall 166 and axis 175 as described above with reference to FIGS. 6 and 7. The position of the tablet with respect to first end wall 166 may establish the type of jacket that may be formed around the tablet. For example, if a jacket including two exposed end faces is desired, e.g., jacket 20 as shown in FIG. 2, the tablet may be positioned and supported with respect to first and second mold end walls 166, 168 such that the end faces of the tablet will not be exposed to jacket material injected during step 206. That is the axial end faces of the tablet may be in respective contact with mold wall inner surfaces 166*a*, 168*a*. Similarly, if a jacket including wall 28 and one exposed end face is desired, e.g., jacket 20 as shown in FIG. 3, the tablet may be positioned and supported with respect to inner surface 166*a* such that an axial end face of the tablet will be exposed to jacket material injected during step 206.

Step 206 may include closing the mold walls with respect to the tablet. As described above, first and second side walls 162, 164 may move in direction A and interior 174 may be formed around the tablet and the first pincers. Interior 174 may be configured to produce the desired jacket, e.g., jacket 42 and/or 120, as shown in any one of FIGS. 2, 3, and/or 5. Step 206 may also include walls 162, 164, 166, 168 sealing interior 174 and forming a space between the outer surface of tablet 12 and interior 174 in which jacket material may be injection molded.

Step 208 may include injection molding the jacket around the tablet, as well as around the first plurality of pincers. Step 208 may include injecting jacket material into interior 174 and allowing the jacket material to flow into the space between inner surface 172 and the outer walls of the tablet via any injection molding process. Injection molding processes are well known in the art and, as such, are not further described. Because the first plurality of pincers are engaged with the tablet within interior 174, the portions of the tablet covered thereby may not be exposed to the jacket material injected during step 208.

Step 210 may include opening the mold walls with respect to the tablet. As described above, first and second side walls 162, 164 may move in direction A unsealing interior 174 and exposing the jacketed tablet.

Step 212 may include removing the tablet and jacket, i.e., a formed linker, with the first plurality of pincers. Specifically, step 208 may include maneuvering the formed linker to a location relatively remote of first end wall 166.

Step 214 may include disengaging the first plurality of pincers from the tablet and, thus, from the formed linker. It is contemplated that the first plurality of pincers may be disengaged or separated from the linker via any conventional manner, such as, for example, vibrating the pincers and/or the linker or axially pulling the pincers relative to the linker. As such, slots 42 and/or 120 may be formed on an end of the formed jacket as an artifact of the first plurality of pincers being disposed within interior 174 during step 208.

Figure 9:
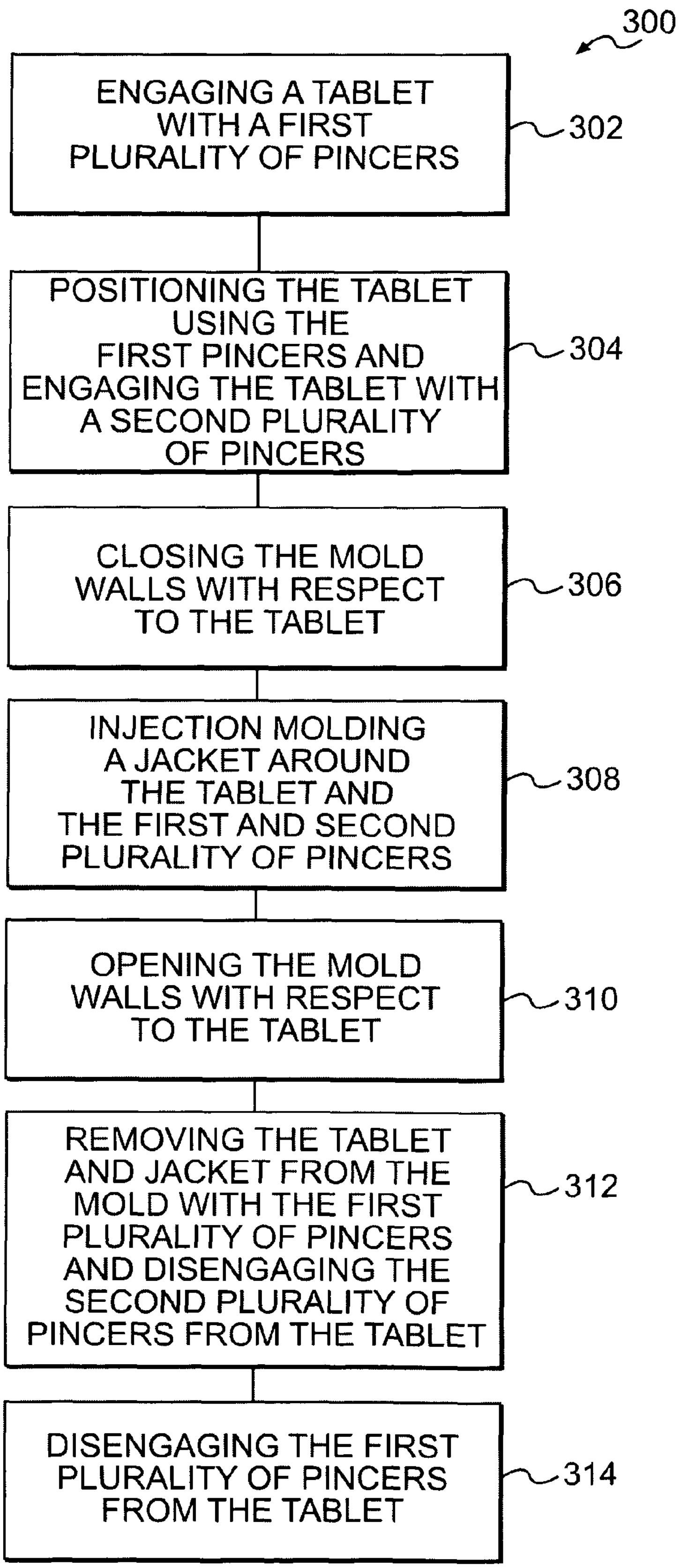
FIG. 9 is a diagrammatic illustration of another exemplary method of manufacturing a linker in accordance with the present disclosure.

FIG. 9 illustrates another exemplary method 300 for manufacturing a filled linker. Method 300 may be similar to method 200 described above with reference to FIG. 7. As such, only the differences are described below. Specifically, method 300 may include locating and positioning the tablet within the mold, via a plurality of second pincers disposed within the mold and cooperating with a plurality of first pincers.

Method 300 may include positioning the tablet with the plurality of first pincers and engaging the tablet with a second plurality of pincers, step 304. Method 300 may also include injection molding a jacket around the tablet and the first and second plurality of pincers, step 308, so as to form a linker, i.e., linker 10 and/or 100. Method 300 may further include removing the tablet and jacket with the first plurality of pincers and disengaging the second plurality of pincers from the tablet, step 312. Steps 302, 306, 310, and 314 may be substantially similar to steps 202, 206, 210, and 214 as described above referencing FIG. 8.

Step 304 may include maneuvering the grasped tablet 12 and/or 102 from a first position relatively remote from the mold walls to a second position relatively adjacent the mold walls. Specifically, step 204 may include positioning the tablet with respect to first end wall 166 and axis 175 as described above with reference to FIGS. 6 and 7. Additionally, step 304 may include engaging the tablet with a second plurality of pincers. Specifically, step 304 may include further maneuvering the grasped tablet with respect to first end wall 166 and second plurality of pincers 182 so as to deflect one or more of second plurality of pincers and produce radial and/or axial forces with respect to the tablet as described above referencing FIGS. 6 and 7. As such, the first and second plurality of pincers may each respectively support the tablet and, thus, step 304 may include the first and second plurality of pincers cooperatively supporting the tablet.

Step 308 may include injection molding a jacket around the tablet and the first and second plurality of pincers. Specifically, step 308 may include injection molding jacket material around the first plurality of pincers as well as around the second plurality of pincers. Step 308 may include injecting jacket material into interior 174 and allowing the jacket material to flow into the space between inner surface 172 and the outer walls of the tablet via any injection molding process. Because the first plurality of pincers and the second pincers are engaged with the tablet and within interior 174, the portions of the tablet covered thereby may not be exposed to the jacket material injected during step 306.

Step 312 may include removing the tablet and jacket, i.e., a formed linker, from the mold and disengaging the second plurality of pincers from the tablet. Specifically, step 312 may include maneuvering the formed linker to a location relatively remote of first end wall 166. The second plurality of pincers may be fixed with respect to first end wall 166 and/or the first plurality of pincers and, thus, may be disengaged from the formed linker when the linker is maneuvered therefrom. As such, slots 42 and/or 120 may be formed on one end of the formed jacket as an artifact of the second plurality of pincers. It is contemplated that the second plurality of pincers may be separately controllable by an actuating mechanism and, as such, may be disengaged from the formed linker by the actuating mechanism.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of manufacturing a linker including a jacket radially confining a preformed tablet, the tablet having a longitudinal axis, axial end faces intersecting the longitudinal axis, an outer surface extending between the axial end faces, and recessed lands surrounding the axial end faces, the method comprising:

a) grasping the tablet with a plurality of first pincers;

b) positioning the grasped tablet and first pincers with respect to a molding apparatus;

c) closing mold walls with respect to the tablet such that the mold walls move from a first position to a second position, the second position being radially inward of the first position with respect to the longitudinal axis of the tablet;

d) injecting jacket material to substantially cover the outer tablet surface and at least a portion of the plurality of first pincers to form the jacket, wherein jacket material flows into the recessed lands;

e) extracting the jacketed tablet and the plurality of first pincers from the molding apparatus; and f) a removing the first pincers from the jacketed tablet.

2. The method as in claim 1, wherein the molding apparatus includes a plurality of second pincers for at least partially supporting the tablet.

3. The method as in claim 1, further including exposing a plurality of voids when removing the first pincers from the jacketed tablet.

4. The method as in claim 1, wherein grasping the tablet with a plurality of first pincers includes grasping the tablet about the outer tablet surface.

5. The method as in claim 1, wherein the grasping, positioning, injecting, extracting, and removing steps are accomplished automatically.

6. The method as in claim 1, wherein the positioning step includes spacing an end of the tablet away from a mold end, whereby a jacket is formed with a closed axial end wall.

7. The method as in claim 1, wherein the molding apparatus includes an inside surface having contours for forming one or more snap-fit elements on the outside of the jacket, and wherein the injecting step includes flowing jacket material around the contours to provide integral snap-fit elements.

8. The method as in claim 1, wherein the molding apparatus includes an inside surface having a circumferential relief for forming a raised band on the linker jacket, and wherein the injecting step includes flowing jacket material into the relief to form an integral band.

9. The method as in claim 8, wherein the injecting step includes flowing the injector material into a mold interior through the relief.

10. The method as in claim 1, further including positioning the grasped tablet with respect to the mold apparatus via the plurality of first pincers and a plurality of second pincers.

11. The method as in claim 1, further including positioning the tablet includes cooperatively supporting the tablet via the plurality of first pincers and a via a plurality of second pincers.

12. The method as in claim 1, wherein the jacket is injection molded of a material selected from hydroxypropyl methylcellulose acetate succinate, polyvinyl alcohol, hydroxypropyl methyl cellulose, and acrylic or methacrylic acid-based polymers.

13. A method of manufacturing a linker including a jacket radially confining a preformed tablet, the tablet having a longitudinal axis, axial end faces intersecting the longitudinal axis, an outer surface extending between the axial end surfaces, and a recessed land surrounding one of the axial end faces, the method comprising:

grasping the tablet with a plurality of first pincers about the recessed land;

positioning the grasped tablet and the first pincers with respect to a molding apparatus;

closing mold walls with respect to the tablet such that the mold walls move from a first position to a second position, the second position being radially inward of the first position with respect to the longitudinal axis of the tablet;

injecting jacket material into the molding apparatus such that the outer surface of the tablet is substantially surrounded by the injected jacket material; and extracting the jacketed tablet from the molding apparatus.

14. The method as in claim 13, further including:

injecting jacket material into the recessed land and covering at least a portion of the first pincers; and removing the first pincers from the jacketed tablet to expose a plurality of voids formed in the jacket.

15. The method as in claim 13 wherein the grasping, positioning, closing, injecting, and extracting, steps are accomplished automatically.

16. The method as in claim 13, wherein the positioning step includes spacing an axial end face of the tablet relative to the molding apparatus so as to form a jacket with a closed axial end wall.

17. The method as in claim 13, wherein the positioning step includes positioning the tablet relative to the molding apparatus so as to form a jacket having at least one open end wall exposing at least one of the axial end faces of the tablet.

18. The method as in claim 13, wherein the positioning step includes positioning the tablet relative to the molding apparatus so as to form a jacket having open end walls exposing the axial end faces of the tablet.

19. The method as in claim 13, wherein the molding apparatus includes an inside surface having contours for forming one or more snap-fit elements on the outside of the jacket, and wherein the injecting step includes flowing jacket material around the contours to provide integral snap-fit elements.

20. The method as in claim 13, wherein the jacket is injection molded of a material selected from hydroxypropyl methylcellulose acetate succinate, polyvinyl alcohol, hydroxypropyl methyl cellulose, and acrylic or methacrylic acid-based polymers.

21. A method of manufacturing a dosage form including a jacket radially confining a preformed tablet, the tablet having a longitudinal axis, axial end faces intersecting the longitudinal axis, and a radial wall extending between the axial end faces, the method comprising:

grasping the tablet with a plurality of first pincers;

positioning the grasped tablet and the first pincers with respect to a molding apparatus;

closing mold walls with respect to the tablet such that the mold walls move from a first position to a second position, the second position being radially inward of the first position with respect to the longitudinal axis of the tablet;

injecting jacket material into the molding apparatus such that the tablet radial wall is substantially surrounded by the injected jacket material and a first one of the axial end faces is at least partially exposed; and extracting the jacketed tablet from the molding apparatus.

22. The method as in claim 21, further including:

injecting jacket material to cover at least a portion of the first pincers; and removing the first pincers from the jacketed tablet to expose a plurality of voids formed in the jacket.

23. The method as in claim 21, wherein the positioning step includes spacing the tablet relative to the molding apparatus so as to form a jacket with a closed axial end wall covering a second one of the axial end faces.

24. The method as in claim 21, wherein the positioning step includes positioning the tablet relative to the molding apparatus such that a second axial end face is exposed.

25. The method as in claim 21, wherein the molding apparatus includes an inside surface having contours for forming one or more snap-fit elements on the outside of the jacket, and wherein the injecting step includes flowing jacket material around the contours to provide integral snap-fit elements.

26. The method as in claim 21, further including injecting jacket material into the molding apparatus such that at least a portion of the injected jacket material flows radially inward relative to the outer surface of the tablet toward a central axis of the tablet.

27. The method as in claim 21, wherein the tablet further includes a recessed land surrounding one of the axial end faces, the method further including injecting jacket material into the molding apparatus such that at least a portion of the injected jacket material flows into the recessed land.

28. The method as in claim 21, wherein the jacket is injection molded of a material selected from hydroxypropyl methylcellulose acetate succinate, polyvinyl alcohol, hydroxypropyl methyl cellulose, and acrylic or methacrylic acid-based polymers.

29. A method of manufacturing a linker including a jacket radially confining a preformed tablet, the tablet having a longitudinal axis, axial end faces intersecting the longitudinal axis, an outer surface extending between the axial end faces, and a recessed land surrounding one of the axial end faces, the method comprising:

a) grasping the tablet with a plurality of first pincers;

b) positioning the grasped tablet and first pincers with respect to a molding apparatus;

c) closing mold walls with respect to the tablet such that the mold walls move from a first position to a second position, the second position being radially inward of the first position with respect to the longitudinal axis of the tablet;

d) injecting jacket material to substantially cover the outer tablet surface and at least a portion of the plurality of first pincers to form the jacket, wherein jacket material flows into the recessed land;

e) extracting the jacketed tablet and the plurality of first pincers from the molding apparatus; and f) removing the first pincers from the jacketed tablet.

30. The method as in claim 1, wherein the grasping step includes grasping a radial outermost wall of the tablet with the plurality of first pincers.

* * * * *

UNITED STATES PATENT AND TRADEMARK OFFICE

CERTIFICATE OF CORRECTION

PATENT NO. : 8,293,159 B2
APPLICATION NO. : 12/285855
DATED : October 23, 2012
INVENTOR(S) : Stephen Mark McAllister It is certified that error appears in the above-identified patent and that said Letters Patent is hereby corrected as shown below:

Claim 1, col. 11, line 42, delete “a” before -- removing --.

Claim 11, col. 12, line 9, “and a via a plurality” should read -- and via a plurality --.

Signed and Sealed this
Twenty-second Day of January, 2013

David J. Kappos
*Director of the United States Patent and Trademark Office*